Patented Apr. 25, 1933

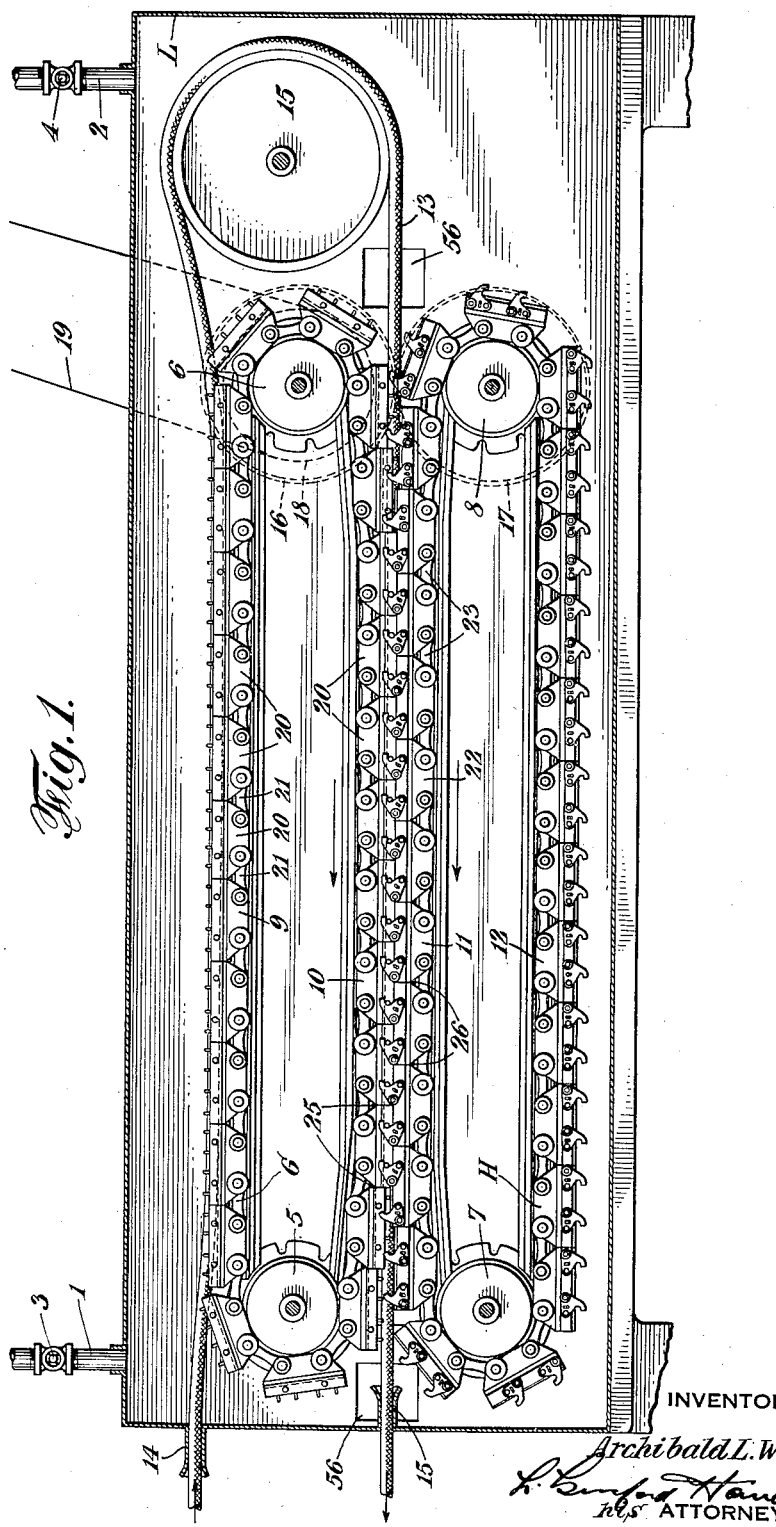

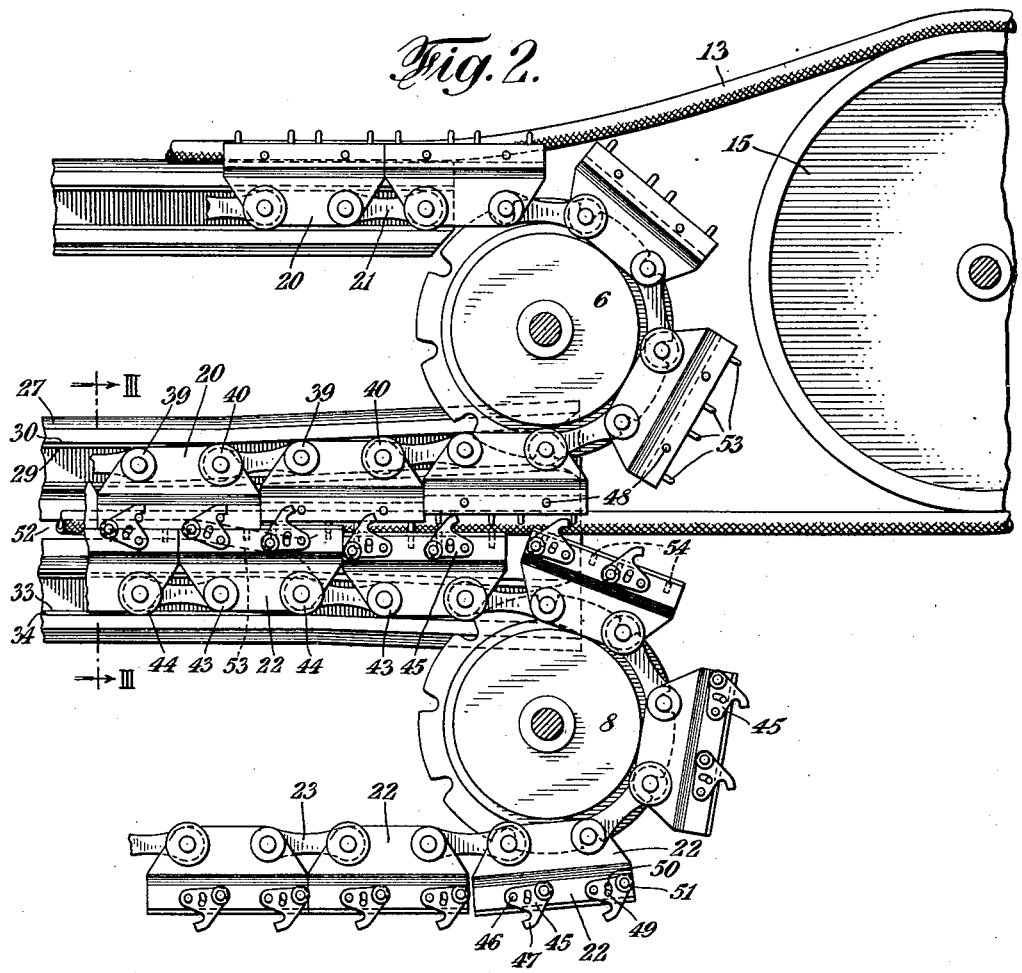
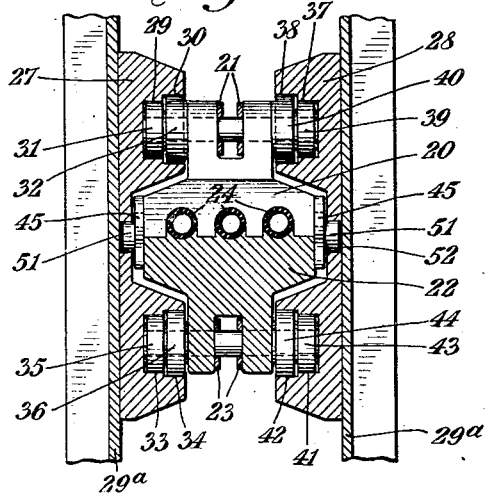
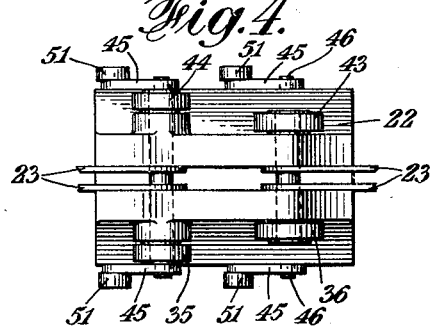
INVENTOR
Archibald L. Wallace.
BY
his ATTORNEY

1,905,663

UNITED STATES PATENT OFFICE

ARCHIBALD L. WALLACE, OF BROOKLYN, NEW YORK

CONTINUOUS VULCANIZING APPARATUS

Application filed July 30, 1930. Serial No. 471,648.

This invention relates to a continuous vulcanizing apparatus, and an object of the invention is to provide a machine which will operate to apply heat and moulding pressure against the article to be treated for a desirable period, the article or articles being fed continuously through the machine.

A more detailed object is to provide a machine which will embody a travelling mold into which an article such as a length of rubber hose may be continuously fed and which will hold the hose under molding pressure for an appropriate period of time during travel of the hose through the machine.

A further object is to provide a pair of endless belt-like structures including mold members which fit together and complete a mold for receiving and conveying the hose through the machine.

A further detailed object is to provide means for causing the mold members to fit together and grip the hose in an efficient manner.

A further detailed object is to provide means to insure that the mold parts will be held in proper assembly with each other throughout the molding or vulcanizing operation.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a side elevational view of a machine constructed in accordance with this invention, the steam chest or casing portion of the machine being shown in vertical section.

Fig. 2 is an enlarged detail view of one end portion of the machine.

Fig. 3 is a further enlarged transverse sectional view upon the plane of line III—III of Fig. 2, and Fig. 4 is a rear plan view of one of the mold members employed.

Referring to the drawings for describing in detail the structure therein illustrated, the reference character L indicates a steam chest or casing having suitable steam controlling means associated therewith as indicated by the pipes 1 and 2 and their valves 3 and 4.

Within the chest L is arranged a pair of rollers as 5 and 6 carrying an endless belt or chain G. A second pair of rollers as 7 and 8 carries a similar chain H.

The endless chain G has an upper lead 9 and a lower lead 10, and the chain H has an upper lead 11 and a lower lead 12.

The lower lead 10 of the chain G and the upper lead 11 of the chain H extend approximately parallel with each other, and the hose as 13 is held between them. The hose is fed into the chest at one end, as through an opening 14, and is carried by the upper lead 9 of the chain G along the length of the chest. At the opposite end of the chest it passes about an idler roll 15 and thence, between the leads 10 and 11 of the chains, back to the first end of the chest and out of a second opening as 15. The hose is of course subjected to the heat of the chest at all times during its passage through the chest.

The rollers and the chains may be driven in any appropriate manner but for the purpose of illustration the drawings herewith suggest that the rollers 6 and 8 may be geared together, as by gears 16 and 17, and that a driving pulley 18 may be connected with the gear 16, and driven as by a belt 19.

The chain G is made up of a series of mould members as 20—20 connected by links 21—21, the mold members cooperating with the links so that together with the mould members 20 they complete a sprocket chain structure as will be readily understood.

The chain H is made up of similar mold members and links as 22—22 and 23—23.

The mold members 20 and 22 are designed so that the downwardly facing surfaces of the mold members 20 on lead 10 co-operate with the upwardly facing surfaces of mold members 22 on lead 11 to provide a moulding cavity as 24 between them, or, if desired, two or more such cavities, three being shown in the present instance, see Fig. 3, each cavity being of a shape and size to conform to that desired for the hose which is clamped within it.

One of the chains is advanced with respect to the other sufficiently so that the mold members engaging the hose alternate with each other and thereby bring the joints as 25—25 between mould members 20—20 intermediate joints 26—26 between the mould members 22—22.

Suitable guide means may be provided for holding the leads 10 and 11 in proper relation to each other so that the moulding surfaces of the mold members will properly grip and shape the hose. For this purpose the drawings herewith suggest the use of a pair of guide plates as 27 and 28 arranged one at each side of the chains, being carried rigid with the side wall members 29ᵃ of the chest L.

The guide plate 27 has a pair of runways as 29 and 30 therein for receiving rollers 31 and 32 projecting at one side of the mould members 20 and a second pair of runways as 33 and 34 therein for receiving rollers 35 and 36 projecting at the same side of the mould members 22.

The guide plate 28 has a pair of runways as 37 and 38 therein for receiving rollers 39 and 40 projecting at the opposite side of the mould members 20 and a second pair of runways as 41 and 42 therein for receiving rollers 43 and 44 projecting at said opposite side of the mould members 22.

If desired, suitable latch devices may be employed for locking the mold members of one lead to those of the other lead during the molding operation. The drawings herewith suggest for this purpose locking plates as 45 pivotally mounted upon the mould members 22 as at 46 and having hook-shaped portions as 47 for engaging studs as 48 carried by the mould members 20. A pin as 49 may project from the mould members 22 and engage within an arcuate slot 50 of the plate 45 to limit the swing of the plates 45 at all times. Each plate carries a roller or stud as 51 which projects into a runway 52 provided by the plates 27 and 28, this runway being shaped to cause the plates to swing about their pivots into and out of locking position. The runways 52 have relatively inclined portions as at 53 adjacent the right hand end of the machine operable to cause the plates to move to locking position as the mold members come together, and said runways have similar inclined portions, not illustrated, at the left hand end of the machine for swinging the plates out of locking position preparatory to the separation of the mold members as the mold members approach the rollers 5 and 7.

In order that the mold members, as they pass around the rollers 6 and 8 for engaging the hose, shall not be likely to pinch or otherwise injure the hose, and in order that none of the material of the hose shall be likely to become wedged between the adjacent mold members of the respective chains, it is desirable that means be provided to insure a substantially straight line movement of the mold members toward each other at this time. To this end the present invention proposes that the runways 29 and 30 and 37 and 38 for the upper mold members and the runways 33 and 34 and 41 and 42 of the lower mold members shall be shaped to receive and guide the mold members accordingly, as clearly indicated in Fig. 2. These runways receive the rollers of the mold members directly between the rollers 6 and 8 and hold the mold members apart somewhat at this point. The runways 29 and 37 of the upper mold member and the runways 33 and 41 of the lower mold member, adjacent the rollers 6 and 8, are shaped on a different incline as compared with the runways 30 and 38 of the upper mold members and the runways 34 and 42 of the lower mold members and co-operate therewith to hold the upper and lower mold members in substantially parallel relation to each other as they move along the runways, the runways meanwhile leading them toward each other without disturbing their parallel relationship.

If desired guide pins as 53—53 may be provided projecting downwardly from the upper mold members for being received within upwardly facing guide sockets 54 provided in the lower mold members.

By this arrangement the mold members move one after the other around the rollers 6—8 but do not immediately engage the hose. They simply assume position with their molding faces in substantially parallel relationship. Then as they travel back toward the opposite end of the machine they at the same time move directly in a straight line toward each other so that their molding faces properly abut and co-operate with each other as the result of this straight line movement, the hose being thereby efficiently gripped and molded between them. Meanwhile the latch or locking members move into locking relationship and hold the mold members against any movement relative to each other during the period of travel of the mold members from one end of the machine to the other.

As the mold members reach the opposite end of the machine their rollers move along portions of the runways which are shaped similarly as just described for the first end, the locks are released as previously described. The mould members move in a straight line away from each other until free of the hose, and then pass around the rollers 5 and 7, as clearly indicated in Fig. 1.

The mold members are maintained in a heated condition by the heat of the chest L within which they operate and the machine may be of any appropriate length sufficient so that the hose, already heated to a desirable extent by its passage into the machine may be held in a properly condensed and molded condition by the heated mold members for a sufficient length of time to insure proper vulcanization of the hose before its ultimate discharge, and this process of vulcanization may be carried on continuously without interruption for as long a period as may be desired or for the treatment of a piece of hose of any desired length.

While the structure as herein shown and described is particularly adapted for the vulcanization of one or more lengths of hose, the same mechanism is obviously usable for the treatment of many other articles, either as continuous ribbons or as a series of individual articles. A hose, or other form of ribbon like article to be treated, may be fed into the machine at the same end from which it is discharged, as illustrated, or it may be fed into the machine at any other point as may be found most expedient according to the material to be treated, the length of time during which it is desired to hold said material within the machine before applying pressure thereto, and other considerations, while if individual articles are to be treated they may be introduced into and removed from the machine in any appropriate manner, as for instance through doors indicated at 55 and 56, the articles being simply placed between the mold members at one end of the machine and removed in a finished condition at the opposite end of the machine.

As many changes could be made in this construction without departing from the scope of the invention as defined in the following claims, it is intended that all matter contained in the above description, or shown in the accompanying drawings; shall be interpreted as illustrative only and not in a limiting sense.

Having thus described my invention, what I claim as new and desire to secure by Letters Patent is:—

1. A vulcanizing machine, comprising a steam chest, a pair of endless chains within said steam chest co-operative to provide parallel leads between which the article to be vulcanized is received, means to continuously drive said chains, means to guide said leads with respect to each other, and co-acting means carried by the leads to lock the leads together.

2. A vulcanizing machine, comprising a steam chest, a pair of endless chains within said steam chest co-operative to provide parallel leads between which the article to be vulcanized is received, means to continuously drive said chains, guide means for said leads, locking means for holding said leads locked together, and said guide means being formed to provide means for controlling said locking means.

3. A vulcanizing machine, comprising a steam chest, a pair of endless chains within said steam chest co-operative to provide parallel leads between which the article to be vulcanized is received, means to continuously drive said chains, latches pivotally mounted upon one of said leads movable into and out of latching engagement with parts of the other lead, means to so move said latches.

4. A vulcanizing machine, comprising a steam chest, a pair of endless chains within said steam chest co-operative to provide parallel leads between which the article to be vulcanized is received, means to continuously drive said chains, means to hold said leads in gripping engagement with the article, the steam chest having an opening through which to introduce the article into the chest, and one of said chains having a lead constituting a conveyor extending from adjacent said opening to adjacent the article receiving end of the first leads serving to carry the article from said opening to adjacent its point of reception between the first mentioned leads.

5. A vulcanizing machine, comprising a steam chest, a pair of endless chains within said steam chest co-operative to provide parallel leads between which the article to be vulcanized is received, means to continuously drive said chains, means to hold said leads in gripping engagement with the article, the steam chest having an opening through one of its end walls adapted to receive the article therethrough, one of said leads constituting a conveyor for receiving the article adjacent said opening and for carrying the article toward the opposite end of the chest, means at said opposite end of the chest for directing the article to position between the first mentioned leads, and a second opening in the mentioned end wall of the chest outwardly through which the article is delivered.

6. A hose vulcanizing machine, comprising a steam chest, a pair of endless chains within said chest co-operative to provide parallel leads between which the hose is received, means to continuously drive said chains, means to hold said leads in gripping engagement with the hose, said chest having an opening therethrough at one end thereof through which the hose may be introduced into the chest, a guide roller at the opposite end of the chest for receiving the hose and for guiding it to position between said mentioned leads, and said chest having a second opening at said first mentioned end thereof outwardly through which the vulcanized hose may move.

7. A vulcanizing machine, comprising a pair of endless chains each having mold members formed as parts thereof to move therewith, rollers about which said chains travel, said chains being arranged so that a lead of one chain moves substantially parallel with a lead of the other chain and so that the mold members of said leads will provide opposing surfaces between which the article to be vulcanized is received, means to continuously drive said chains, means for guiding said mold members toward each other in a direction substantially normal to said parallel leads for gripping said article, holding means for holding the mold members in gripping engagement with the article, means to release said holding means, and means for heating said mold members.

8. A vulcanizing machine, comprising a pair of endless chains each having mold members formed as parts thereof to move therewith, rollers about which said chains travel, said chains being arranged so that a lead of one chain moves substantially parallel with a lead of the other chain and so that the mold members of said leads will provide opposing surfaces between which the article to be vulcanized is received, means to continuously drive said chains, means for guiding said mold members toward each other in a direction substantially normal to said parallel leads for gripping said article, means operable in consequence of the travel of said chains for holding said mold members in gripping engagement with the article, means also operable in consequence of the travel of said chains for releasing said mold members, and means for heating said mold members.

9. A vulcanizing machine, comprising a pair of endless chains each having mold members formed as parts thereof to move therewith, rollers about which said chains travel, said chains being arranged so that a lead of one chain moves substantially parallel with a lead of the other chain and so that the mold members of said leads will provide opposing surfaces between which the article to be vulcanized is received, means to continuously drive said chains, means operable in consequence of the travel of said chains for guiding said mold members toward each other in a direction substantially normal to said parallel leads for gripping said article, means also operable in consequence of the travel of said chains for guiding said mold members away from each other in a direction substantially normal to said parallel leads for releasing said article, and means for heating said mold members.

10. A vulcanizing machine, comprising a pair of endless chains each having mold members formed as parts thereof to move therewith, rollers about which said chains travel, said chains being arranged so that a lead of one chain moves substantially parallel with a lead of the other chain and so that the mold members of said leads will provide opposing surfaces between which the article to be vulcanized is received, means to continuously drive said chains, means operable in consequence of the travel of said chains for guiding said mold members toward each other in a direction substantially normal to said parallel leads for gripping said article, means also operable in consequence of the travel of said chains for holding said mold members in gripping engagement with the article, means also operable in consequence of the travel of said chains for releasing said mold members, means also operable in consequence of the travel of said chains for guiding said mold members away from each other in a direction substantially normal to said parallel leads for releasing said article, and means for heating said mold members.

11. A hose vulcanizing machine, comprising a pair of endless chains each having mold members formed as parts thereof to move therewith, rollers about which said chains travel, said chains being arranged so that a lead of one chain moves substantially parallel with a lead of the other chain and so that the mold members of said leads will provide opposing surfaces between which the hose to be vulcanized is received, means to continuously drive said chains, means operable in consequence of the travel of said chains for guiding said mold members toward each other in a direction substantially normal to said parallel leads for gripping said hose between them, means to maintain the mold members in gripping engagement with the hose during the travel of the mold members and hose, means also operable in consequence of the travel of said chains for guiding said mold members away from each other in a direction substantially normal to said parallel leads for releasing said hose, and means for heating said mold members.

12. A hose vulcanizing machine, comprising a pair of endless chains each having mold members formed as parts thereof to move therewith, rollers about which said chains travel, said chains being arranged so that a lead of one chain moves substantially parallel with a lead of the other chain and so that the mold members of said leads will provide opposing surfaces between which the hose to be vulcanized is received, means to continuously drive said chains, means providing runways along which parts of said mold members travel operable in consequence of the travel of the mold members to move the mold members towards each other in a direction substantially normal to said parallel leads for gripping said hose between them, said runways co-operating with the mentioned parts of the mold members to hold the mold members in gripping engagement with the hose during travel of the mold members and hose, said runways co-operating with the mentioned parts of the mold members to move the mold members away from each other in a direction substantially normal to said parallel leads for releasing the hose, and means for heating the mold members.

13. A vulcanizing machine comprising a pair of endless chains each having mold members formed as parts thereof, and guide means for the chains arranged to provide parallel leads therefor between which the article to be vulcanized is gripped, said guide means having parts co-operative with parts of the mold members to move the mold members into and out of gripping position in a direction substantially normal to said parallel leads.

14. A vulcanizing machine, comprising a pair of endless chains each having mold members formed as parts thereof, and guide means for the chains arranged to provide parallel leads therefor between which the article to be vulcanized is gripped, said guide means having a pair of separate inclined runways disposed to engage different parts respectively of the passing mold members adapted to move the mold members into and out of gripping position in a direction substantially normal to said parallel leads.

15. A vulcanizing machine, comprising a pair of endless chains each having mold members formed as parts thereof, plates at opposite sides of the chains, stepped runways on the plates, said runways being inclined at each end of the machine, the inclination being differential for adjacent stepped portions, and a plurality of rollers on the chains cooperative with said runways to move the mold members into and out of gripping position in a direction substantially normal to said parallel leads.

16. A vulcanizing machine, comprising a steam chest, a pair of endless chains within said steam chest co-operative to provide parallel leads between which the article to be vulcanized is received at one end thereof, said steam chest having an opening on the opposite side from that adjacent the receiving end of the leads, and one of said leads constituting a conveyor for carrying the article from the opening across the chest before said article is received between the leads.

In testimony whereof I affix my signature.

ARCHIBALD L. WALLACE.